UNITED STATES PATENT OFFICE.

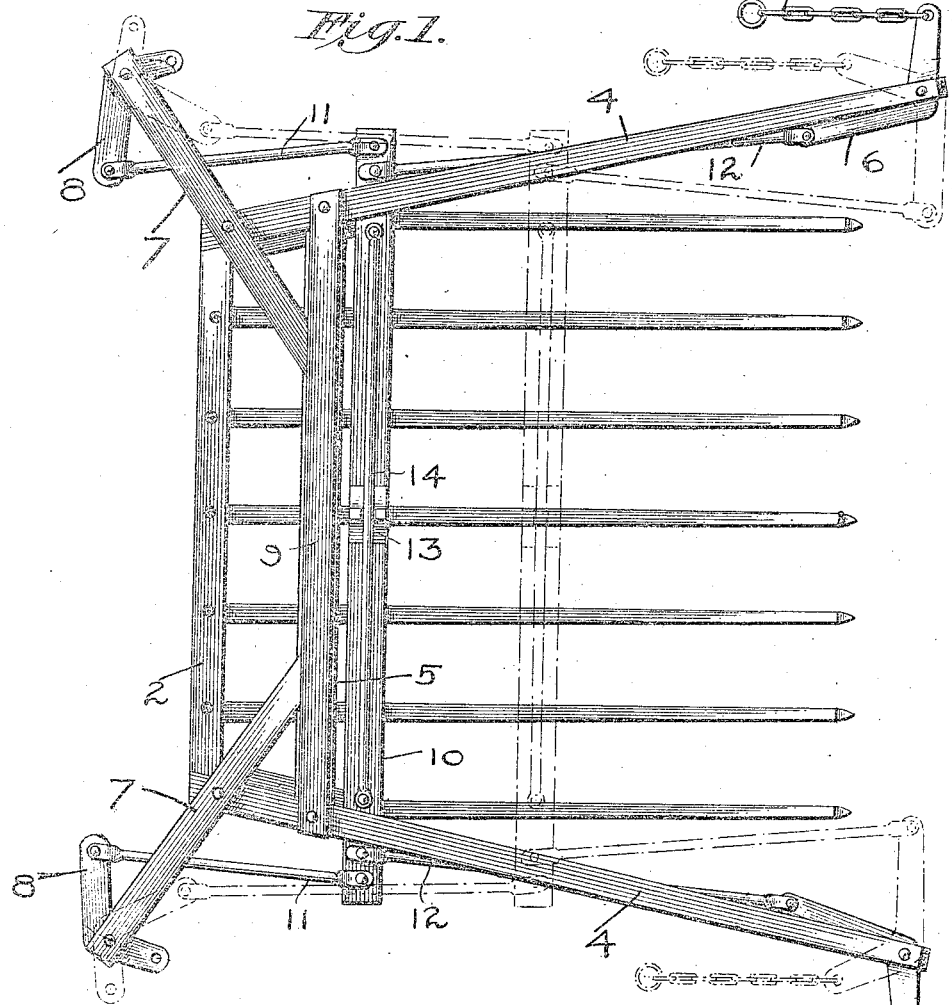

JOSEPH T. BELL, OF LEOLA, SOUTH DAKOTA.

HORSE-RAKE.

960,253.   Specification of Letters Patent.   Patented June 7, 1910.

Application filed December 5, 1908. Serial No. 466,188.

*To all whom it may concern:*

Be it known that I, JOSEPH T. BELL, a citizen of the United States, residing at Leola, in the county of McPherson and State of South Dakota, have invented certain new and useful Improvements in Horse-Rakes, of which the following is a specification.

My invention relates to rakes of the drag type and has for its object the improvement of the construction of devices of the class stated to the end that provision is made for hitching the animals on each side of the rake to bell-crank levers fulcrumed on arms secured to the rake frame and connecting a clearer bar to the levers so that when the rake is being drawn forwardly the bar is at the rear end of the rake teeth and when the animals are stopped and backed to dump the rake the clearer bar is drawn toward the ends of the prongs to relieve them of the load.

My invention will be described in detail hereinafter and illustrated in the accompanying drawings in which—

Figure 1 is a top plan view of my improved rake, and Fig. 2, a side view.

In the drawings similar reference characters indicate corresponding parts in both views.

The teeth 1 of my improved rake are secured to cross-beams 2 and 3.

4 indicates arms secured to cross-beam 2 and a cross piece 5 secured on cross-beam 3, said arms 4 having their free ends extending upwardly and outwardly and forwardly as shown and having bell crank levers 6 fulcrumed on their free ends.

7 indicates arms secured to the rear ends of arms 4 and the top of cross pieces 5 and having their outer ends at substantially the same distance from the central, longitudinal, median line of the rake frame as the free ends of the arms 4 and have bell crank levers 8 fulcrumed thereon.

9 indicates a cross piece secured over cross piece 5, arms 4 and the ends of arms 7, said cross-pieces 5 and 8 together with cross-beam 3 forming an abutment for the material loaded on the rake when in operation.

10 indicates a clearer bar loosely mounted on teeth 1 and connected to levers 6 and 8 by means of rods 11 and 12, respectively, pivotally secured to one arm of each of the levers and to the ends of clearer bar 10.

13 indicates a projection in the middle of bar 10 and 14 a rod secured adjacent to the ends of the bar and over said projection, said construction serving not only as a truss to strengthen the bar but also to assist in pushing off the contents of the rake when moved to the position shown in broken lines in Fig. 1.

The draft animals are hitched one at each side of the rake to the free arms of lever 8 and chains 15 secured to the free arms of levers 6 so that when the animals are going forwardly the strain of the draft will be exerted on levers 8 and the cross bar 10 will be drawn back to the position shown in full lines in Fig. 1 so that the greatest amount of room is made on the teeth for the reception of the grass, etc., to be gathered. When the animals are stopped and backed the swinging of levers 6 will first pull the cross bar 10 against the load forcing the load forward on the rake and a continuation of the backing of the animals will withdraw the prongs and cross bar from the load and the rake will be ready for another load.

Having thus described my invention what I claim is—

A horse rake comprising cross beams, teeth secured to said cross beams, a cross bar loosely mounted on the teeth, a projection in the middle of the cross-bar, a truss rod secured to the cross-bar and over said projection, forwardly extending arms secured to the cross-beams and extending upwardly and outwardly from the rake, rearwardly extending arms also secured to said cross-beams and extending upwardly and outwardly from the rake, bell crank levers fulcrumed on the ends of said arms, and rods connecting one arm of each of the levers with the ends of the cross-bar, the draft animals being hitched to the free arms of the levers.

JOSEPH T. BELL.

Witnesses:
LESLIE E. TURNER,
W. TURNER.